United States Patent
Suzuki

(10) Patent No.: US 7,724,391 B2
(45) Date of Patent: May 25, 2010

(54) IMAGE PROCESSING APPARATUS, IMAGE PROCESSING METHOD AND PROGRAM

(75) Inventor: Akira Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1135 days.

(21) Appl. No.: 11/355,853

(22) Filed: Feb. 16, 2006

(65) Prior Publication Data

US 2006/0192986 A1   Aug. 31, 2006

(30) Foreign Application Priority Data

Feb. 28, 2005   (JP)   ............... 2005-054536

(51) Int. Cl.
G06K 15/00   (2006.01)
G06F 3/12   (2006.01)
G06F 15/00   (2006.01)
G06K 1/00   (2006.01)
H04N 1/46   (2006.01)
G06K 9/34   (2006.01)

(52) U.S. Cl. .............. 358/1.18; 358/1.16; 358/1.17; 358/1.1; 358/530; 358/540; 382/173

(58) Field of Classification Search .............. 358/1.1, 358/1.13, 1.16, 1.17, 1.18, 530, 540; 382/173
See application file for complete search history.

(56) References Cited

U.S. PATENT DOCUMENTS

| 4,554,592 | A | * | 11/1985 | Yoshida | 358/449 |
| 5,903,280 | A | * | 5/1999 | Horiguchi | 345/501 |
| 5,991,515 | A | * | 11/1999 | Fall et al. | 358/1.15 |
| 6,128,096 | A | * | 10/2000 | Furuya et al. | 358/1.17 |
| 6,542,255 | B1 | | 4/2003 | Nakamura | 358/1.17 |
| 2004/0240894 | A1 | * | 12/2004 | Tomita et al. | 399/17 |

* cited by examiner

Primary Examiner—Mark K Zimmerman
Assistant Examiner—Fan Zhang
(74) Attorney, Agent, or Firm—Cowan, Liebowitz & Latman, P.C.

(57) ABSTRACT

To provide an image processing apparatus, an image processing method and a program that can decrease the frequency at which the object is externally referenced at the time of drawing and improve the drawing efficiency by suitably adjusting the bandwidth so that each element block of a structured document data may be included in one band. Therefore, the image processing apparatus scans the page of the structured document data in dividing the structured document data having plural element blocks into plural bands. The number of element blocks where an object to be externally referenced on the scanned line is arranged is detected. And the line at which the detected number of element blocks is decrease is set up as a divided line of the structured document data.

9 Claims, 12 Drawing Sheets

FIG. 10

| VERTICAL ZONE Z | EXTERNAL REFERENCE X | NUMBER OF ELEMENT BLOCKS N | DECREASE IN N VALUE D | DELIMITER INFORMATION /COORDINATES Y |
|---|---|---|---|---|
| 1 | | 1 | | |
| 2 | | 0 | PRESENT | Y1 |
| 3 | | 1 | | |
| 4 | PRESENT | 2 | | |
| 5 | | 1 | PRESENT | Y4 |
| 6 | | 0 | PRESENT | Y5 |
| 7 | PRESENT | 1 | | |

IMAGE PROCESSING APPARATUS, IMAGE PROCESSING METHOD AND PROGRAM

FIELD OF THE INVENTION

The present invention relates to an image processing apparatus, an image processing method and a program for printing digital contents by dividing a plurality of element blocks of the structured document data into plural bands.

BACKGROUND OF THE INVENTION

Conventionally, when digital contents such as an HTML file distributed by using data communications through the digital data broadcasting or the Internet is printed by the printer, the layout information of one page is divided into plural bands. A drawing process for each band is performed. That is, a rendering process for converting an object included in each band into the drawing data is performed.

This is because a printer having insufficient memory capacity can not hold the drawing data of one page at any time. In this case, it is required to perform a process for converting the object included in the area of band to be drawn into the drawing data by referring to the object from the printer side (external reference process). In such an external reference process, the printer analyzes the contents described in the input HTML file, and acquires an address at which the object such as image data is actually stored. And it accesses a device corresponding to the address and acquires the object such as image data.

Therefore, when the same object covers plural bands, the printer is required to make the external reference to the same object many times, every time the drawing process for each band is performed. Consequently, the print processing time is longer, and the drawing efficiency is worse.

On the contrary, there is a technology in which the band height is temporarily decided to set an initial value for every band sequentially, the total sum of object drawing areas within the height is calculated, and the band height is adjusted to be a preset threshold or less sequentially (U.S. Pat. No. 6,542,255).

However, the above-mentioned technology of U.S. Pat. No. 6,542,255 does not decrease the frequency at which the object is externally referenced. In this prior technical document, a technology is disclosed in which it is judged whether or not a figure takes long time for processing, and for the figure that takes long time for processing, a band of the minimum height containing its drawing range is set to improve the processing efficiency. However, with the constitution of achieving the technology concerned, it is not possible to decrease the frequency at which the object is externally referenced, because the object of graphic or text to be processed relatively simply may continue to extend over plural bands.

For instance, in the case of analyzing a structured document data and dividing the layout information of one page obtained into plural bands to make the drawing, if an object extending over plural bands appears, not only the band dividing process becomes complex, but also the drawing efficiency is lower because external reference to the same object occurs every time. Especially when the address of the object is one of an external apparatus via a network, for example, the Internet, the drawing efficiency is remarkably worse.

Generally, in the digital television, and recently the portable equipment such as a cellular phone or a digital camera, the digital contents described in a markup language are often handled. However, the hardware resources are limited for the small portable equipment as mentioned above. Therefore, a rendering process of digital contents described in the markup language, especially the rendering process that draws the intermediate data already laid out becomes a large load on the hardware resources in the portable equipment. Accordingly, it is necessary to decrease the frequency at which the object is externally referenced, even for the object such as graphic or text that is relatively simply processed.

This invention has been achieved in the light of the above-mentioned circumstances, and it is an object of the invention to provide an image processing apparatus, an image processing method and a program that can decrease the frequency at which the object is externally referenced at the time of drawing and improve the drawing efficiency by suitably adjusting the bandwidth so that each element block of a structured document data may be included in one band.

SUMMARY OF THE INVENTION

In consideration of the above object, the invention provides an image processing apparatus having a lower frequency at which the object is externally referenced at the time of drawing and the improved drawing efficiency by adjusting the bandwidth so that each element block of a structured document data may be included in one band.

In order to accomplish at least one object, according to one embodiment of the invention, there is provided a constitution of an image processing apparatus for dividing a page layout information from a structured document data having a plurality of element blocks into a plurality of bands, comprising:

detection means for detecting a decrease of the number of element blocks where an object to be externally referenced on a scanned line is arranged by scanning the page layout information from the top in order; and setting means for setting a devided line at a position where the decrease of the number of element blocks is detected by the detection means.

From another aspect of the invention, there is provided a constitution of an image processing method for dividing a page layout information from a structured document data having a plurality of element blocks into a plurality of bands, comprising:

a detection step of detecting a decrease of the number of element blocks where an object to be externally referenced on a scanned line is arranged by scanning the page layout information from the top in order; and a setting step of setting a devided line where the number of element blocks detected at a position where the decrease of the number of element blocks is detected at the detection step.

Other aspects and features of the invention will be apparent from the following specification and drawings.

BRIEF DESCRIPTION OF THE DRAWINGS

FIG. 10 is a view showing one example of a zone map or a zone table applied to division into the bands;

DETAILED DESCRIPTION OF THE PREFERRED EMBODIMENTS

The preferred embodiments of the present invention will be described below with reference to the drawings.

Figure 1:
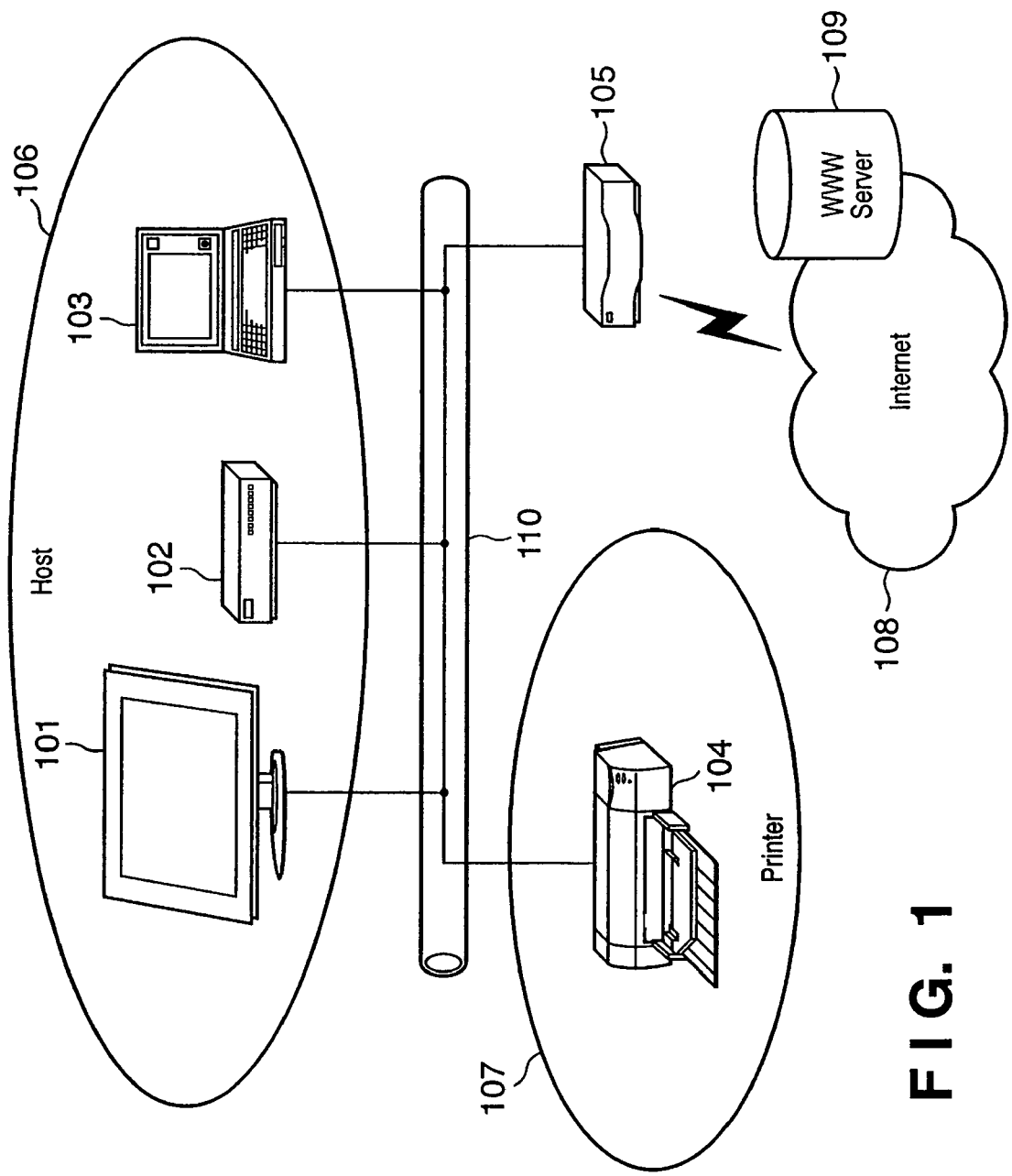
FIG. 1 is a diagram showing an apparatus connection configuration example of an image processing system in a home network environment according to an embodiment of the present invention.

FIG. 1 is a diagram showing an apparatus connection configuration example of an image processing system in a home network environment according to an embodiment of the invention. As shown in FIG. 1, this image processing system comprises the host's side equipment (Host) 106 and the printer's side equipment (Printer) 107 that are communicable with each other via a network 110 such as Ethernet (registered trademark). Herein, the host's side equipment 106 may be a digital broadcasting television (DTV) 101, a set top box (STB) 102 or a personal computer (PC) 103, as shown in FIG. 1. Also, the printer's side equipment 107 may be a network printer (Network Printer) 104.

Further, the above equipment connected to the network 110 such as Ethernet (registered trademark) can be also connected to the Internet (Internet) 108 via a broadband router (Router) 105. Accordingly, the equipment can browse the contents data on a web server (WWW Server) 109 at will.

Figure 2:
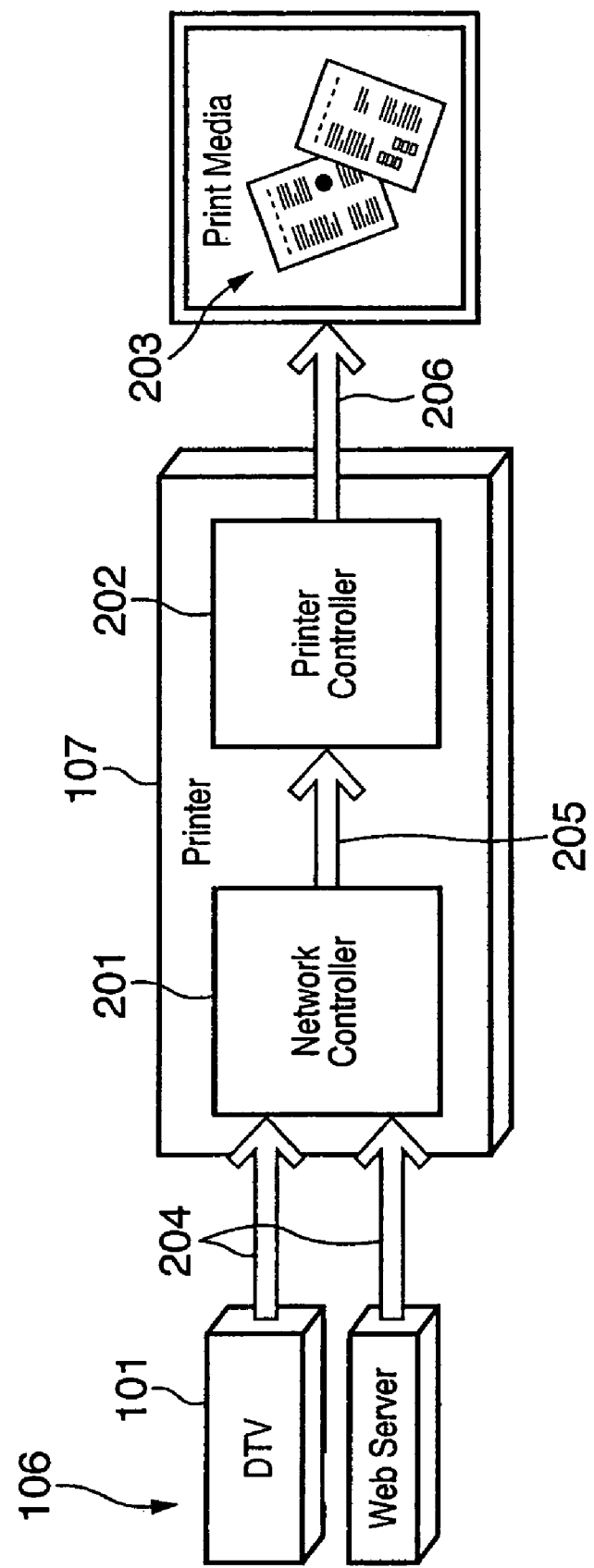
FIG. 2 is a diagram for explaining how to perform a printing process in the image processing system as shown in FIG. 1.

FIG. 2 is a diagram for explaining how to perform a printing process in the image processing system as shown in FIG. 1. In FIG. 2, the host's side equipment 106 is not premised to be a PC having high processing performance, but has a system configuration in which the DTV 101 and the printer's side equipment 107 (e.g., network printer 104) are connected one-to-one. In this system configuration, the DTV 101 of the host's side equipment 106 does not generate the print data using a printer driver, but directly supplies the printing contents data generated in an XHTML (Extensible Hypertext Language) format to the printer's side equipment 107, which interprets and prints the print data.

In the system as shown in FIG. 2, the contents data is inputted in an "individual file format" or a packaged "collective module format". Herein, this printing process is not limited to a "push type" or the printing process according to an input instruction of the contents, but a "pull type" or the form in which the location of the contents is indicated and the contents are referenced and acquired by the printer itself.

The printing operation of the system as shown in FIG. 2 will be described below. The network data (Network data) 204 including print data in the XHTML format is transmitted from the DTV 101 via a network 110 such as Ethernet (registered trademark) to the printer's side equipment 107.

In the printer's side equipment 107, a network controller (Network Controller) 201 temporarily stores a part or all of the received data, selects out the contents data (Contents data) 205, converts it into one print job format, and passes it to a printer controller (Printer Controller) 202. And the printer controller 202 interprets the contents data 205 passed from the network controller 201, generates the image data (Image data) for printing, and outputs an image (Output) 206 to a print media (Print Media) 203. The printing operation is performed in this manner.

Figure 3:
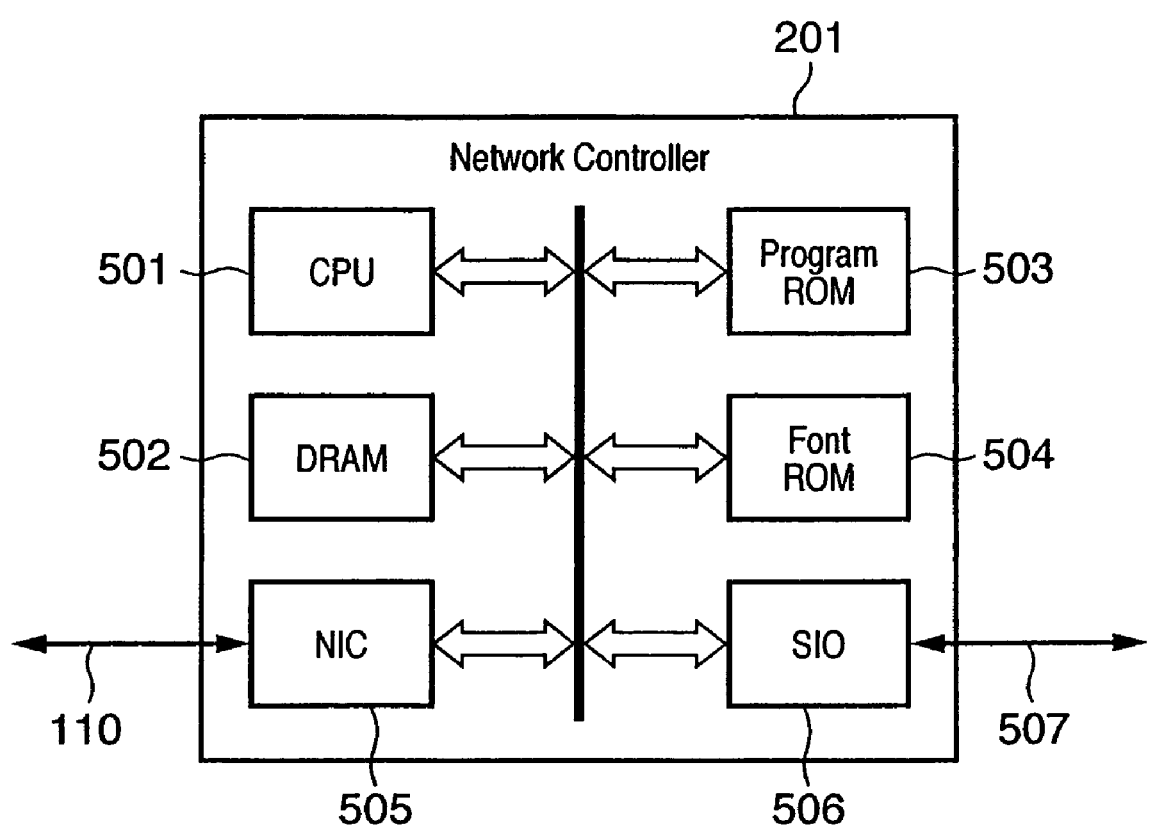
FIG. 3 is a block diagram showing the inner structure of a network controller 201 as shown in FIG. 2.

FIG. 3 is a block diagram showing an inner structure of the network controller 201 as shown in FIG. 2. As shown in FIG. 3, the network controller 201 comprises a CPU 501 for taking charge of the main control, a DRAM 502 useful as a buffer memory or a work memory for temporarily saving the network data 204 such as object obtained by external reference, a network interface controller (NIC) 505 for making the communications with the host's side equipment 106 connected to the network 110 such as Ethernet (registered trademark), a program ROM 503 in which an execution program is written, a font ROM 504 in which font data is written, and a serial IO (SIO) 506 used for making the communications with the printer controller 202, which are interconnected via an internal bus.

Figure 4:
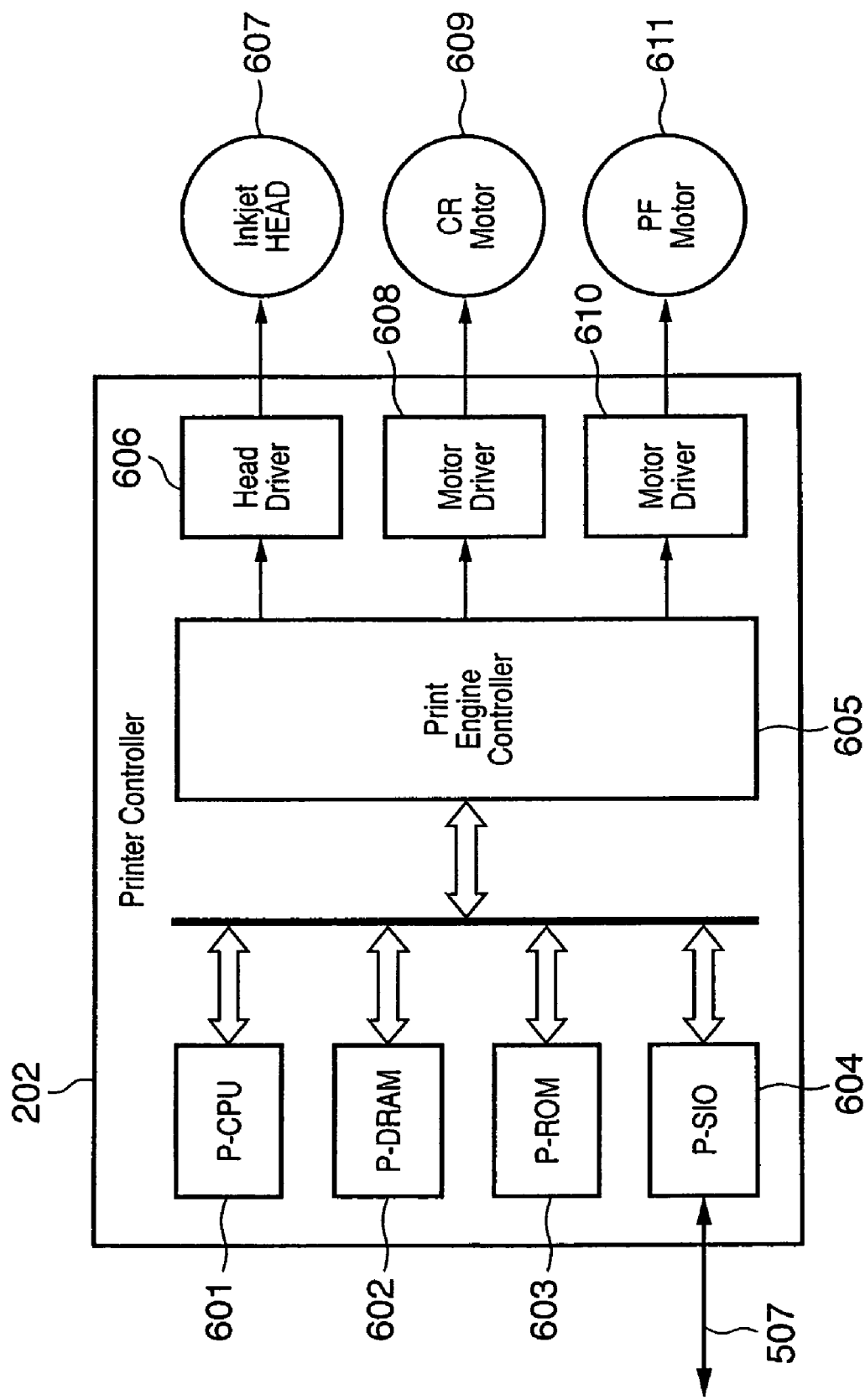
FIG. 4 is a block diagram showing the inner structure of a printer controller 202 as shown in FIG. 2.

FIG. 4 is a block diagram showing an inner structure of the printer controller 202 as shown in FIG. 2. As shown in FIG. 4, the printer controller 202 comprises a P-CPU 601 for taking charge of the main control, a P-DRAM 602 useful as a pool memory or a work memory that functions as a band memory for temporarily saving the contents data 205 received from the network controller 201, a P-ROM 603 in which an execution program is written, and a P-SIO 604 for making the communications with the network controller 201 connected through the serial IO, in which each of the blocks is connected via an internal bus to a print engine controller (Print Engine Controller) 605, and controls a head driver 606 for driving an ink jet head 607 in a printing mechanism part, a motor driver 608 for driving a carriage motor 609, and a motor driver 610 for driving a paper feed motor 611 via the print engine controller 605.

Figure 5:
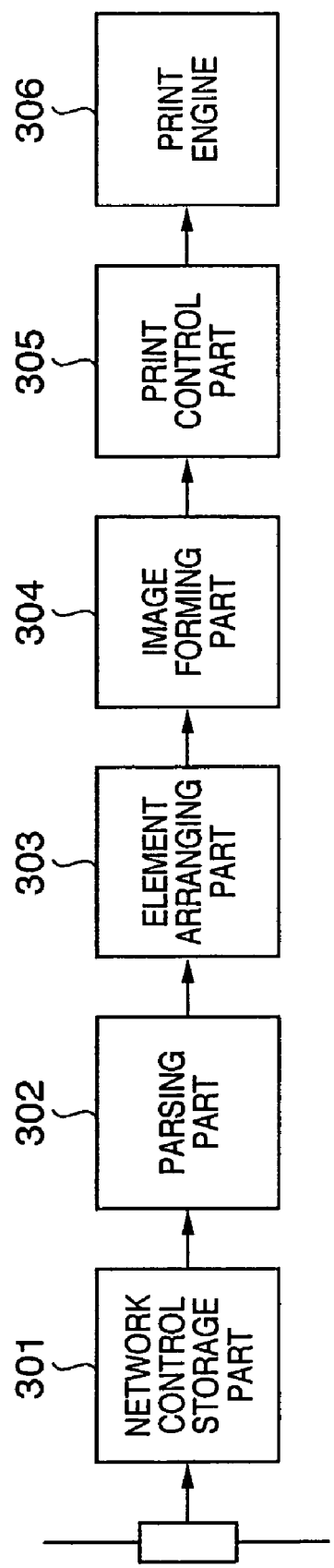
FIG. 5 is a block diagram showing the module configuration of a software processing inside the printer's side equipment 107 (e.g., network printer 104) according to this embodiment.

FIG. 5 is a block diagram showing the module configuration of a software process inside the printer's side equipment 107 (e.g., network printer 104) according to one embodiment of the invention. The network printer 104 of this embodiment is an ink jet printer, for example.

First of all, a network control storage part 301 making up the printer's side equipment 107 is the part corresponding to the processing of the network controller 201. Herein, the functions of print job control, printing operation settings and linkage with an external apparatus such as a monitor are fulfilled. A parsing part 302 makes a process for converting the contents which is composed by text data into data of tree structure. Further, an element arranging part 303 makes a process for arranging the elements, BOX model, characters and images within the page, based on the specifications such as a style associated with each element, successively from an upper layer of an element tree obtained through a parsing process in the parsing part 302. An image model in an XHTML document format uses a box, or "rectangle". Also, the entity of "layout information" outputted from the element arranging part 303 is a "set of drawing commands" for every page in an intermediate state leading to the image.

An image forming part 304 makes a process for creating an actual image from the layout information, in response to a set of drawing commands, for every page, and outputting the bit map data of multi-value RGB to a print control part 305. A technique in which the processing time is shortened by a banding process as will be described later, and the memory space is optimized is applied to a conversion process in the image forming part 304.

The print control part 305 is a main control part of a print engine 306. The print control part 305 converts the input multi-value RGB image data into "binary YMCK" in an input format of the ink jet print engine, further converts it into a format adaptable to a drive pattern of an ink jet head, and sequentially outputs data of each color. Herein, a print band memory is included in the P-DRAM 603, but has a capacity of at least two bands in this embodiment, as will be described later. In addition, the print control part 305 takes charge of the output control, monitors a print execution situation, and outputs the status information of printer to the network controller 201.

The print engine 306 performs a process of a printer movable part comprising a head for discharging the ink in accordance with image data, a carriage mechanism for scanning a carrier part on which the head is mounted, and a paper feed mechanism used to convey the media.

Figure 6:
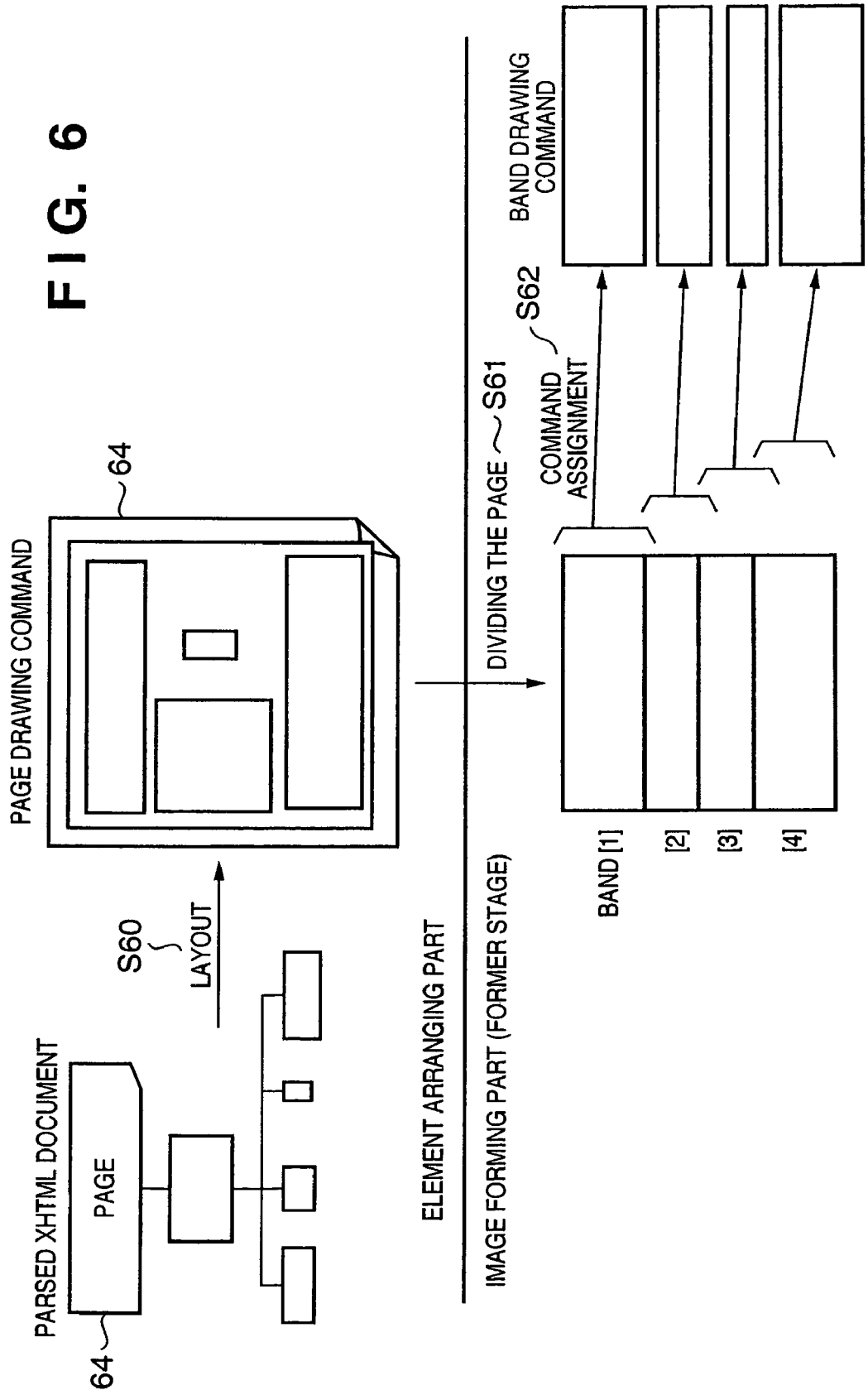
FIG. 6 is a view for explaining the processing contents of an element arranging part 303 and the former stage of an image forming part 304 in the printer's side equipment 107 as shown in FIG. 5.

FIG. 6 is a view for explaining the processing contents of the element arranging part 303 and the former stage of the image forming part 304 in the printer's side equipment 107 as shown in FIG. 5. In FIG. 6, a banding process is particularly involved. For simpler explanation, a document corresponding to one page is described, but the process is equivalent for plural sheets.

First of all, in the parsing part 302 and the element arranging part 303 inheriting its results, a layout forming process for forming the layout information of one page is performed (step S60). In this embodiment, the layout information is represented on the basis of "rectangle" shape. That is, it is represented by, on the basis of the coordinate position at a left upper corner (angle), height size and width size. Also, the information concerning the contents of object is appended to the layout information. For example, an external reference address for the image, or a character code or font information for the text is appended. Also, the background color of a rectangular area may be appended as the additional information. Generally, the layout information includes the information of the form having an intermediate abstract degree between the document data and the final image, which is described in an intermediate language or a display list with lower abstract degree, within a category of information of this kind.

Subsequently, a page division process (step S61) is performed. From the viewpoint of making effective use of a limited memory capacity to effect the fast processing, the division number of page is decided by the size of drawing box to be arranged (area where the object such as image is arranged) and the memory capacity. Herein, if the division number is too large, the number of drawing boxes included in one band is increased, making the process for the box extending over plural bands complex. Specifically, the frequency at which the object within the drawing box is externally referenced is increased, lowering the processing efficiency. Conversely, if the division number is too small, the memory capacity must be increased, whereby the purpose of division is not met. Accordingly, it is required that the maximum and minimum values of band height are decided in advance.

After boundary lines for dividing the page is decided, a command assigning process (step S62) for actually assigning a command itself to each band is performed. In FIG. 6, an example of the structured document data in which four small blocks exist at the lower level of a parent block where the background color is set is shown, as indicated by numerals 64. For simpler explanation, four small blocks are noted. In this embodiment, one block is composed of a set of drawing commands.

For instance, it is supposed that one band is decided by the working of a program according to this embodiment. Herein, plural blocks exist within the decided band. Thus, the drawing commands of the block divided into plural bands among these blocks are reconfigured.

Figure 7:
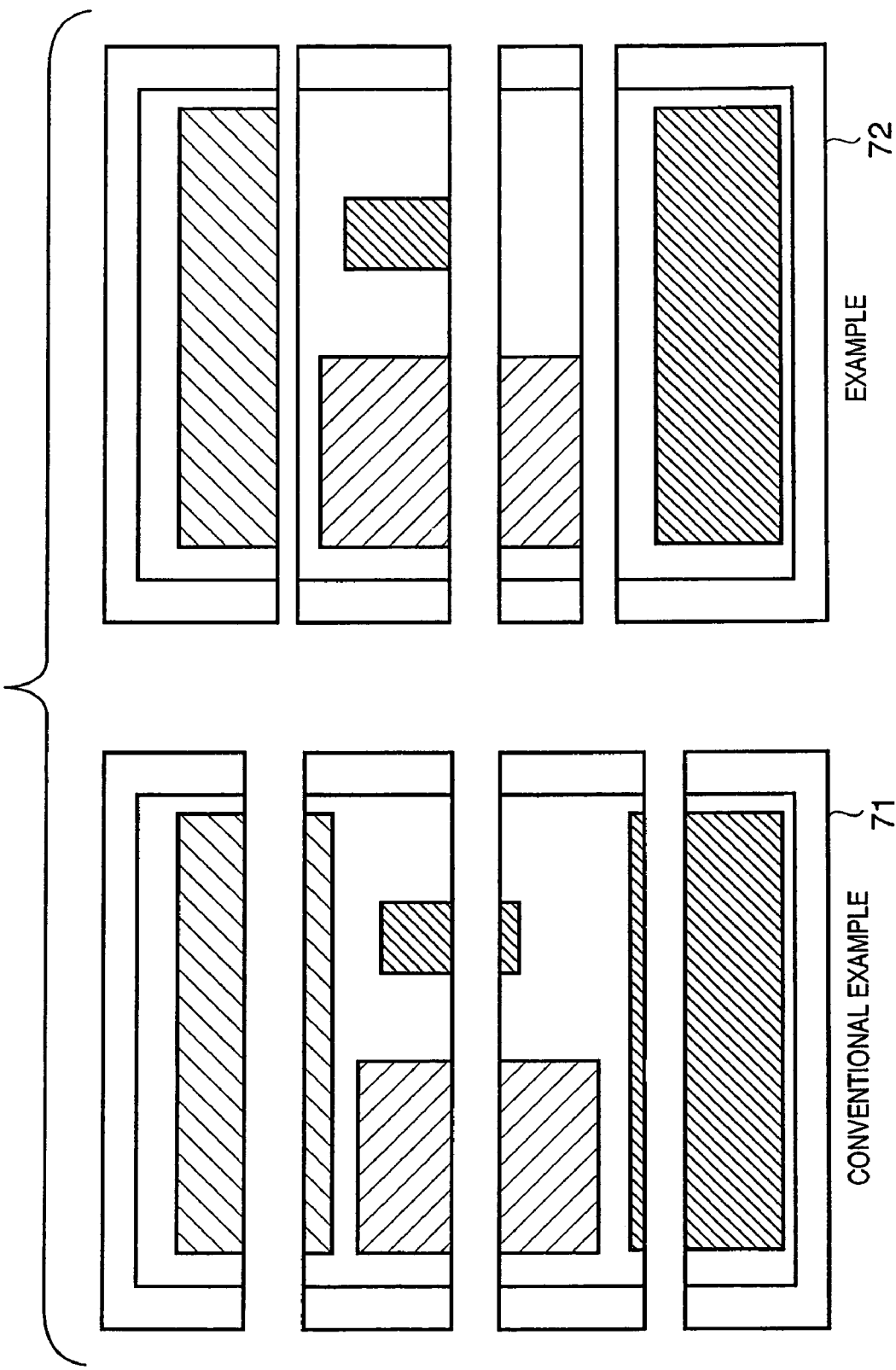
FIG. 7 is a view showing the processing results of the former stage of the image forming part 304 in the printer's side equipment 107 as shown in FIG. 5.

FIG. 7 is a view showing the results of a former stage process of the image forming part 304 in the printer's side equipment 107 as shown in FIG. 5. In FIG. 7, a resultant example (left side: 71) of the banding process in the conventional example and a resultant example of the process according to this embodiment (right side: 72) are represented. In FIG. 7, the number of dividing the band is not changed from the conventional case, but the height of band is adjusted so that the block within the page does not extend over the bands in this embodiment, although the height of each band is even in the conventional example.

Figure 8:
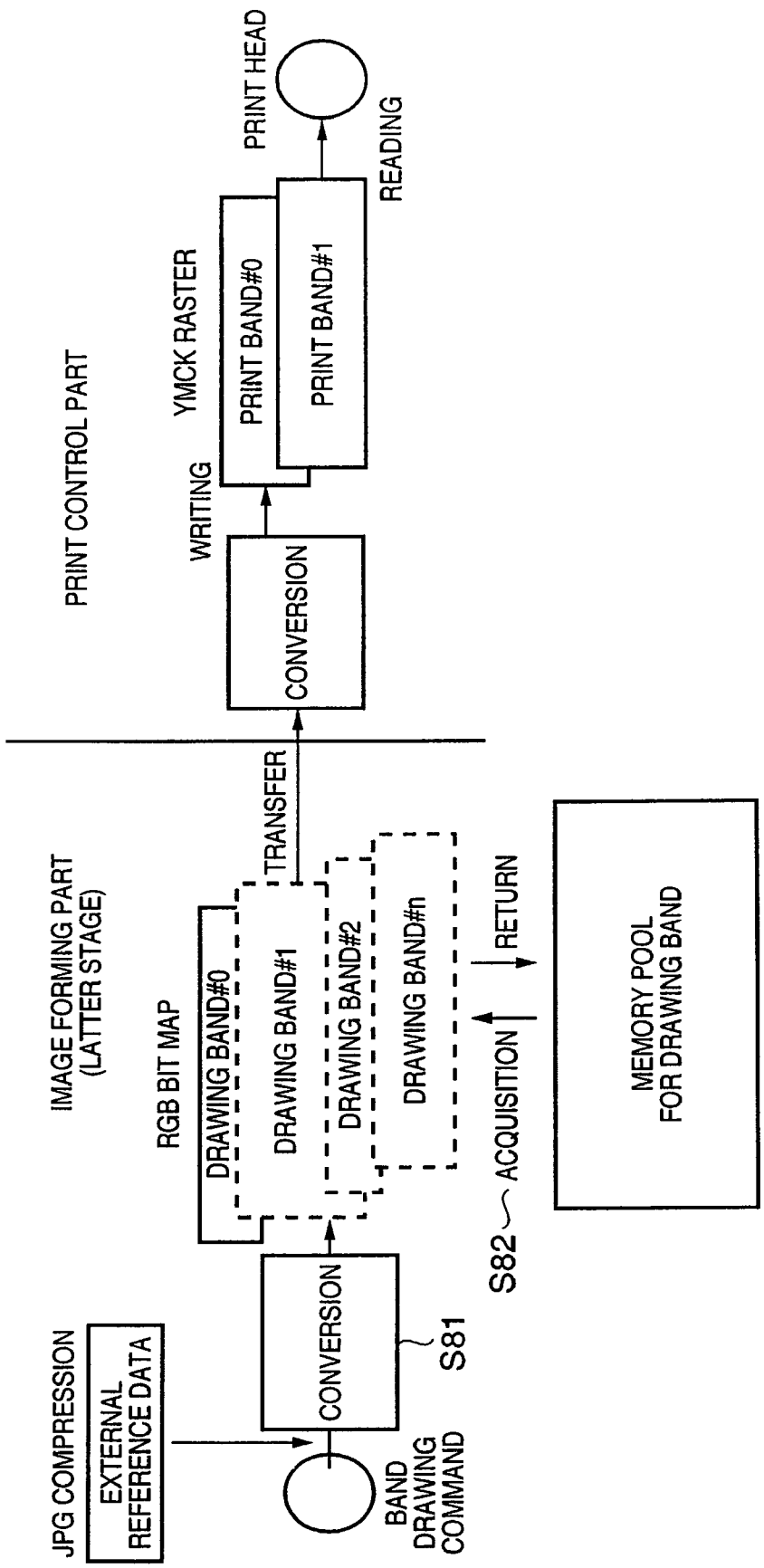
FIG. 8 is a view for explaining a latter process of the image forming part 304 in the printer's side equipment 107 as shown in FIG. 5, namely, an actual drawing process using the divided band drawing information and the processing contents in a print control part 305 inheriting the processing results.

FIG. 8 is a view showing the results of a latter stage process of the image forming part 304 in the printer's side equipment 107 as shown in FIG. 5, that is, a process for actually drawing using the divided band drawing information and the processing contents of the print control part 305 inheriting its processing results.

First of all, a drawing command concerning one band is inputted (step S81). Next, a drawing band memory required for drawing is segmented from the memory pool and allocated (step S82). It is supposed that the capacity of drawing band memory is varied depending on the height of drawing band. On the other hand, the data formed in the drawing band is converted into the print data conforming to the print engine mechanism by the working of the print control part 305 and held in the print band memory. This conversion process involves conversion from RGB bit map data into YMCK raster data including the color space, color matching, black synthesis and data format conversion. Herein, the print band memory is the memory of fixed length in this embodiment. Usually, the print band memory alternately performs the writing and reading of equal size in two series. A data array conforms to the organization of print head nozzles in the ink jet method, for example.

A main part of the drawing command is the area coordinates of box and the external reference address. If an external reference occurs during drawing, an acquisition routine for external data is initiated, and the acquired object is expanded for the compression format such as JPEG, and formed on the memory by cutting out a portion contained within the band range. The text data is drawn by the working of a font generator and developed over the memory. Herein, the output data format is generally the bit map data represented in 8 bits for each color of RGB.

The drawing band memory is practically about half of the total capacity of memory pool. Conversely, the capacity of memory pool, including the capacity of print band memory, requires at least two bands of the maximum bandwidth or more. Also, the print data formed in the drawing band is sequentially transferred to the print band memory, as soon as the print band memory becomes empty. In this manner, if all the contents of the drawing band memory are read from the print control part 305, the drawing band memory is returned (released) to the memory pool.

Figure 9:
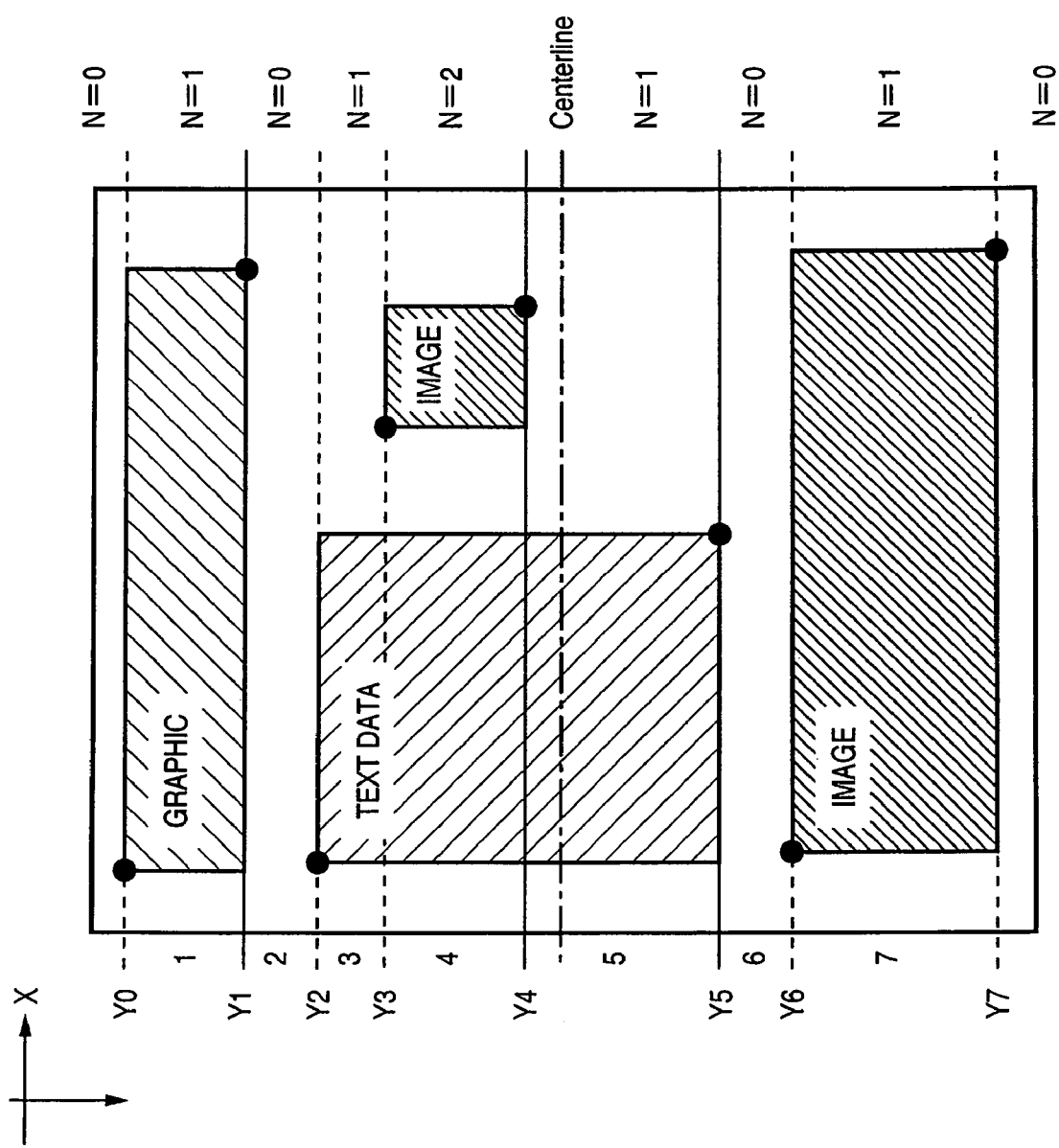
FIG. 9 is a view for explaining the contents of a band dividing process in the image processing system according to this embodiment.

FIG. 9 is a view for explaining the band division processing contents in the image processing system according to one embodiment of the invention. In FIG. 9, an object arrangement example on the page consisting of photo (image), text and graphics is illustrated. The layout information of the page is represented with an object of "rectangle" called an element block, and saved with the positional information (x, y) specifying an arrangement area of the object appended. Herein, the image data is given a URL of the web server as the reference address, and acquired by using a predetermined protocol, every time its entity is needed. The layout information including the information as shown in FIG. 9 is scanned by a program as will be described later, whereby the proper division position is found.

FIG. 10 is a view showing one example of a zone map or a zone table applied to divide the band. The left three columns of the table as shown in FIG. 10 are based on the data obtained by the preparation for a process for deciding the band division. In the printer controller 202, the print engine controller 605, as the initialization, scans the page layout information in order from the top (upper) to the last (lower), creates the data concerning the number of element blocks (area where the object for external reference is arranged) located on the scan line as indicated in the table of FIG. 10, and stores it in the P-DRAM 602.

In the table as shown in FIG. 10, a vertical zone Z indicates the zone number for plural zones divided along the vertical axis in which the existence of block is changed in a range where the block appears within the page, and is numbered as 1, 2, 3, . . . from the upper side of the page. A flag X indicates the existence of an object requiring the external reference in the block including the image data. Further, the number N of element blocks indicates the number of element blocks involving each section on the horizontal coordinate axis. In the example of FIG. 9, the N value is 1, 0, 1, 2, 1, 0 and 1 for the zone 1, 2, 3, 4, 5, 6 and 7.

On the other hand, one of the right two columns in the table as shown in FIG. 10 is a flag D marking the detection of a decrease point of the N value by the working of a program as will be described later. The table of FIG. 10 lists the results that are actually written. Further, the delimiter information coordinate Y is the vertical coordinate of the coordinates at which the object is detected in FIG. 10. In the zones 2, 5 and 6 of this example, Y1, Y4 and Y5 are detected as the delimiter information of band, or the delimiter candidate.

Figure 11:
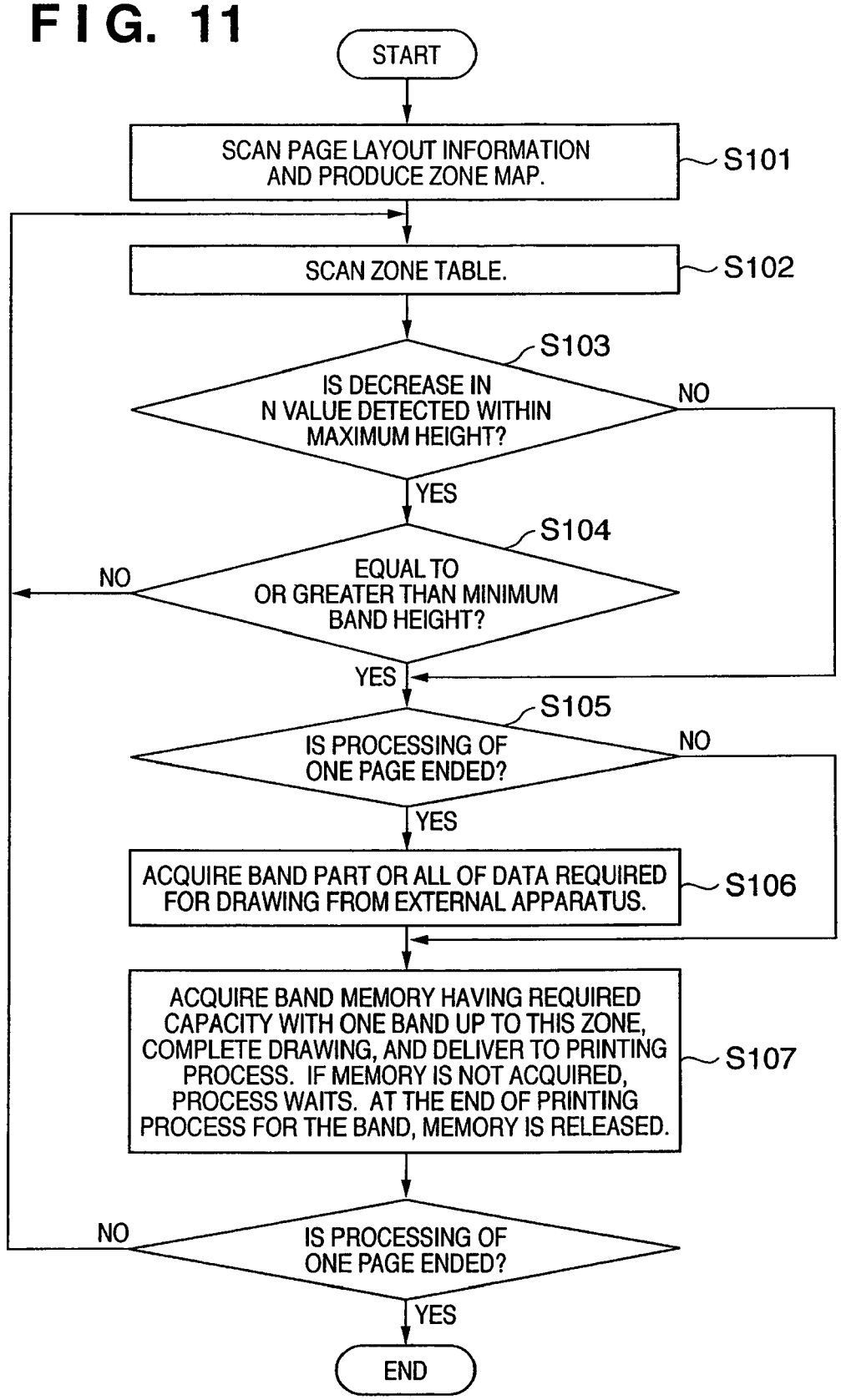
FIG. 11 is a flowchart for explaining one example of a band dividing procedure performed by a P-CPC 601 in the printer controller 202 according to this embodiment.

FIG. 11 is a flowchart for explaining one example of a band dividing procedure performed by the P-CPU 601 of the printer controller 202 according to one embodiment of the invention. In the flowchart of FIG. 11, a dividing process and a drawing process are consecutively performed. That is, a practical method for creating the zone table as shown in FIG. 10, and performing a drawing operation while optimally dividing the band will be described below.

First of all, the page layout information of the structured document data having plural element blocks analyzed beforehand is scanned to create the zone table as shown in FIG. 10 (step S101). And the zone table is scanned for every zone (step S102). And a determination is made whether or not a decrease in the N value is detected within the preset maximum height (step S103). If detected, a determination is made whether or not the detected height is greater than or equal to the preset minimum band height (step S104). As a result, if it is at the minimum band height or more (Yes), a determination is made whether or not the processing of one page is ended (step S105).

If the processing of one page is not ended, and there is any zone not scanned (No), the procedure goes to step S107. At step S107, the required capacity of drawing band memory is allocated from the memory pool, with one band up to the detected zone where the N value decreases, the drawing of the object is completed, and the object is delivered to the print control part 305 to make the printing process. A memory area used by the drawing band memory is released to the memory pool. And a determination is made again whether or not the processing for one page is ended (step S108).

As a result, if the processing for one page is not ended (No), the procedure returns to step S102 to scan the next zone table. If a decrease in the N value is not detected within the preset maximum height at step S103 (No), the procedure goes to step S105.

If the processing for one page is ended and there is no zone not scanned (Yes) at step S105, a band part or all of the data required for drawing is acquired from the external apparatus (step S106), and the procedure goes to step S107.

In this embodiment, the band height is adjusted so that the arrangement box may not extend over the bands, but additionally, the box requiring the external reference may be weighted and preferentially completed within the band to decrease the number of external references.

Further, the zone is scanned from the top of page in accordance with the direction of printing the data by the print engine to print the print data successively. Conversely, the same process may be performed from the rear end of the page. With this method, the allocation and deallocation of the memory can be dynamically controlled, the capacity of memory is saved and the processing efficiency is improved. In drawing the object, if there is external reference data within the band, the data required for drawing is acquired from the external apparatus possessing the data.

Figure 12:
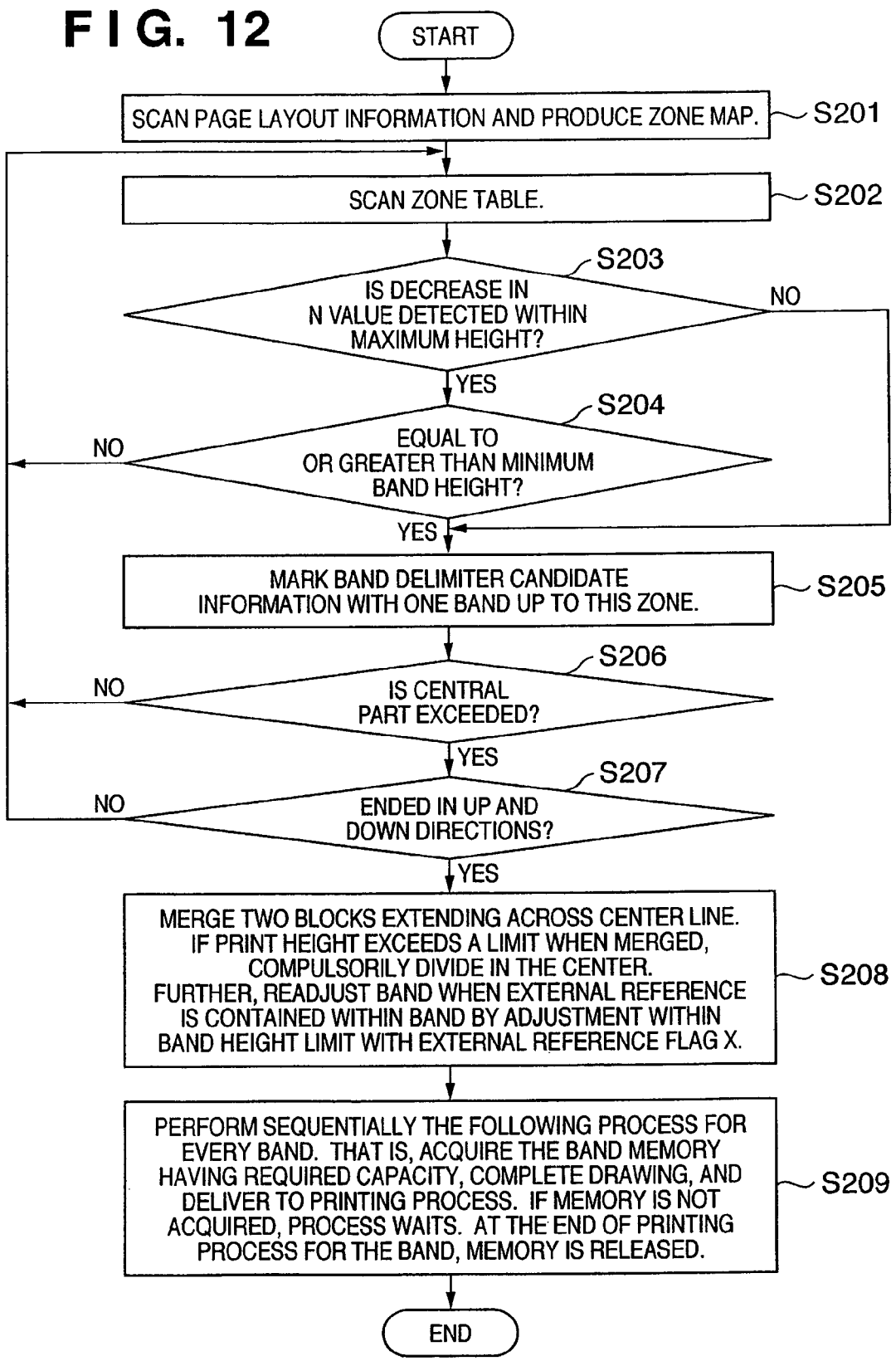
FIG. 12 is a flowchart for explaining an example of another processing procedure performed by the P-CPC 601 in the printer controller 202 according to this embodiment.

FIG. 12 is a flowchart for explaining another processing procedure example performed by the P-CPU 601 of the print controller 202 according to one embodiment of the invention. The flowchart as shown in FIG. 12 is a method of starting the actual drawing, after deciding the band. That is, this method is a processing method for producing in advance the band delimiter information, readjusting the information as much as possible, based on the miscellaneous information such as external reference flag X, and starting the band drawing.

In the procedure as shown in FIG. 12, the former half processing is ended from the leading edge of page to the center, and the next processing scans from the trailing edge of page to the central part. This method makes the adjustment in the central part, noting that the leading edge and the trailing edge are necessarily the band delimiter.

First of all, the page layout information of the structured document data having plural element blocks is scanned to create the zone table as shown in FIG. 10 (step S201). And the zone table is scanned (e.g., from the page information) for every zone (step S202). And a determination is made whether or not a decrease in the N value is detected within the preset maximum height (step S203). If detected, a determination is made whether or not the detected height is greater than or equal to the preset minimum band height (step S204). As a result, if it is at the minimum band height or more (Yes), one band up to the detected zone is registered (marked) as the band delimiter candidate information (step S205).

And a determination is made whether or not the scanning exceeds the central part of page (step S206). If not exceeded (No), the procedure returns to step S202 to perform the above process for the next zone table. On the other hand, if it is determined that the central part is exceeded (Yes), a determination is made whether or not the scanning from the up and down direction is ended (step S207). As a result, if the scanning is ended from only one direction (e.g., from the up direction) (No), the procedure returns to step S202 to perform the scanning from the other direction (e.g., from the down direction) in the same manner.

If it is determined at step S207 that the scanning from both directions is ended (Yes), the procedure goes to step S208 to merge two blocks extending over the center line, but if the print height exceeds the limit height in merging, the zone is compulsorily divided in the center part. Also, when the external reference block is contained within the band by adjustment within the band height limit, based on the external reference flag X, the band is readjusted.

Next, the procedure goes to step S209, where the drawing band memory having a required capacity is acquired for each band, the drawing is completed, and the object is delivered to the print control part 305. If the drawing band memory is not acquired, the process waits. Also, after the printing process for each band is ended, the drawing band memory is released to the memory pool.

In the example of FIG. 12, the method of decreasing the number of external references using the weighting flag X of the box in which external reference occurs is applied more effectively than the first procedure as shown in FIG. 11, whereby a higher band segmentation process is enabled. In this embodiment, since the text block is finally divided, and the image block (external reference block) is not divided, the readjustment is not effective, as shown in FIG. 9.

As described above, the drawing efficiency is improved by implementing the optimal banding function. Especially when there is external reference data such as image block within the band, it is possible to decrease the number of references greatly, whereby the drawing efficiency is improved.

Though the embodiment has been detailed above, the invention may take the embodiments as a system, an apparatus, a method, a program or a storage medium (recording medium). Specifically, the invention may be applied to the system consisting of plural apparatuses, or one apparatus.

The invention may be achieved by supplying a software program (program corresponding to the flowchart as shown in the drawings of this embodiment) for implementing the functions of the above-described embodiment directly or remotely to the system or the apparatus, and reading and executing the supplied program code using the computer of the system or apparatus.

Accordingly, the program code itself installed in the computer to implement the functions or processes of the invention on the computer may constitute the invention. That is, the invention may encompass the computer code itself for implementing the functions or processes of the invention.

In this case, the program may be object code, program executed by an interpreter, or script data supplied to the OS, as far as there are the functions of the program.

The recording medium for supplying the program may be a floppy (registered trademark) disk, a hard disk, an optical disk, an optical magnetic disk, MO, CD-ROM, CD-R, CD-RW, a magnetic tape, a non-volatile memory card, ROM, or DVD (DVD-ROM, DVD-R).

In addition, a supply method for the program may include connecting to a home page of the Internet employing a browser of the client computer, and downloading the computer program itself, or a compressed file including an automatic install function from the home page to a recording medium such as a hard disk. Also, the program code making up the program of the invention may be divided into plural files, each file being downloaded from different home page. That is, the invention may encompass a WWW server that downloads a program file for implementing the functions or processes of the invention on the computer to a plurality of users.

Also, the program of the invention may be encrypted and stored in a storage medium such as CD-ROM, delivered to the user, in which the user who clears the predetermined condition downloads the key information for decryption via the Internet from the home page, executes the encrypted program employing the key information, and installs the program into the computer.

Also, the computer may execute the read program to implement the functions of the embodiment, or the OS operating on the computer may perform a part or all of the actual processes, based on the instructions of the program, to implement the functions of the embodiment.

Moreover, a program read from the recording medium may be written into a function extension board inserted into the computer, or a memory provided for a function extension unit, and the CPU provided for the function extension board or the function extension unit may perform a part or all of the actual processes, based on the instructions of the program, to implement the functions of the embodiment.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-054536, filed Feb. 28, 2005, which is hereby incorporated by reference herein in its entirety.

What is claimed is:

1. An image processing apparatus comprising:
a generation unit configured to generate page layout information based on structured document data, the page layout information having a plurality of element blocks;
a counting unit configured to count number of the element blocks on each scanned line of the page layout information;
a producing unit configured to produce a zone table indicating a correspondence between a zone in the page layout information and the counted number of the element blocks;
a detecting unit configured to detect a reduction in the counted number of the element blocks by scanning, for each zone, the number of the element blocks in the zone indicated by the zone table; and
a setting unit configured to set a plurality of bands in the page layout information based on the detected reduction in the number of element blocks, each of the bands having at least one of the zones and having at least one element block.

2. The image processing apparatus according to claim 1, wherein the counting unit counts the number of element blocks where an object which is externally referenced is arranged.

3. The image processing apparatus according to claim 1, further comprising a first input unit configured to input a maximum height of the band, wherein the setting unit sets the plurality of bands under a condition that each of the plurality of bands is at the maximum height or less.

4. The image processing apparatus according to claim 3, further comprising a first decision unit configured to decide the maximum height of the band based on a memory capacity possessed by the image processing apparatus for drawing and printing the structured document data.

5. The image processing apparatus according to claim 1, further comprising a second input unit configured to input a minimum height of the band, wherein the setting unit sets the plurality of bands under a condition that each of the plurality of bands is at a minimum height or more.

6. The image processing apparatus according to claim 5, further comprising a second decision unit configured to decide the minimum height of the band based on a print band height in the image processing apparatus for drawing and printing the structured document data.

7. The image processing apparatus according to claim 1, wherein the detection unit detects the change in the counted number of element blocks on each line by scanning the number of the element block in the zone indicated by the zone table from an upper end and a lower end of the structured document data.

8. An image processing method comprising:
   generating with a first processor page layout information based on structured document data, the page layout information having a plurality of element blocks;
   counting with a second processor a number of the element blocks on each scanned line of the page layout information;
   producing with a third processor a zone table indicating a correspondence between a zone in the page layout information and the counted number of the element blocks;
   detecting with a fourth processor a reduction in the counted number of the element blocks by scanning, for each zone, the number of the element blocks in the zone indicated by the zone table; and
   setting with a fifth processor a plurality of bands in the page layout information based on the detected reduction in the number of element blocks, each of the bands having at least one of the zones and having at least one element block;
   wherein some or all of said processors may be the same processor.

9. A computer readable medium storing a computer program, which when executed by one or more processors implements a method comprising:
   generating page layout information based on structured document data, the page layout information having a plurality of element blocks; counting a number of the element blocks on each scanned line of the page layout information;
   producing a zone table indicating a correspondence between a zone in the page layout information and the counted number of the element blocks;
   detecting a reduction in the counted number of the element blocks by scanning, for each zone, the number of the element blocks in the zone indicated by the zone table; and
   setting a plurality of bands in the page layout information based on the detected reduction in the number of element blocks, each of the bands having at least one of the zones and having at least one element block.

* * * * *